United States Patent [19]
Yamada

[11] Patent Number: 5,147,024
[45] Date of Patent: Sep. 15, 1992

[54] ROLLER CONVEYOR

[76] Inventor: Ryuzo Yamada, 3-36, Saiwai-cho, Tajimi (507), Japan

[21] Appl. No.: 813,946

[22] Filed: Dec. 24, 1991

[30] Foreign Application Priority Data

Jun. 3, 1991 [JP] Japan .................................. 3-159776

[51] Int. Cl.$^5$ ............................................. B65G 13/07
[52] U.S. Cl. .................................. 198/781; 198/790
[58] Field of Search .................................. 198/781, 790

[56] References Cited

U.S. PATENT DOCUMENTS

| | | | |
|---|---|---|---|
| 3,605,990 | 9/1971 | Cowen, Jr. ........................... | 198/781 |
| 4,421,224 | 12/1983 | Dingman ............................. | 198/781 |
| 4,448,302 | 5/1984 | Weaver et al. ...................... | 198/781 |
| 4,508,212 | 4/1985 | Bolle et al. ........................... | 198/781 |
| 4,993,541 | 2/1991 | Roh ...................................... | 198/781 |
| 5,012,920 | 5/1991 | Wakefield ............................ | 198/781 |

*Primary Examiner*—D. Glenn Dayoan
*Attorney, Agent, or Firm*—Emmanuel J. Lobato; Robert E. Burns

[57] ABSTRACT

With the screw driven into the female-threaded hole which radially extends through the hollow roller and opens to the outer peripheral surface of the cylindrical portion forming a part of the sprocket, the hollow roller is coupled to the sprocket and functions as a drive roller adapted to rotate integrally therewith. When both female-threaded holes have no screw received therein, the hollow roller functions as a free roller which is rotatable with respect to the sprocket. With the screw driven into the female-threaded hole opening to the outer peripheral surface of the diameter-enlarged block which forms a part of the friction tube, the hollow roller is coupled to said friction tube and functions as a friction roller adapted, upon inhibition of its rotation, to stop rotation of the friction tube and to generate a slippage between the friction surface defined by the friction tube and the friction surface defined by the sprocket but, so long as being allowed to rotate, to rotate integrally with both the friction tube and the sprocket. In this manner, the hollow roller can be used as any one of these drive roller, free roller and friction roller merely by selectively driving or removing the respective screws into or from the respective female-threaded holes.

1 Claim, 1 Drawing Sheet

ROLLER CONVEYOR

BACKGROUND OF THE INVENTION

1. Field of the Invention

The present invention relates to a roller conveyor allowing a program to be changed depending on a change in conveying requirements imposed along a path of conveyance and allowing radial bearings to be reliably protected against an axial external force.

2. Description of the Prior Art

In the roller conveyor of prior art comprising a plurality of rollers arranged in parallel to one another so that an object to be conveyed is placed thereon and conveyed, the rollers of three types are selectively employed at the locations suitable for them along the path of conveyance depending the conveying requirements in order to achieve the desired conveyance free from a slippage between the object to be conveyed and the rollers. More specifically, at the location where the object should be forcibly moved, said object is moved by the drive roller adapted to rotate integrally with the sprocket which is in engagement with the drive chain. At the location where the object should be moved by means other than the drive roller, the free roller rotatably supported is used so that free movement of the object can be assured. At the location where movement of the object should be temporarily inhibited by making said object bump against the stopper, the friction roller adapted to rotate integrally with the sprocket under effect of a frictional force is used so that, when movement of the object is inhibited by the stopper, the friction roller ceases to rotate against the frictional force between the friction roller and the sprocket continuing to rotate and, once the inhibition by the stopper is lifted, the friction roller rotates integrally with the sprocket to move the object.

However, the conventional roller conveyor is of the arrangement such that the drive roller, the free roller and the friction roller can not be utilized for purposes other than their respective exclusive purposes as mentioned above and, consequently, it has conventionally been impossible to replace these rollers by those of different types. Accordingly, for particular conveying requirements imposed along the path of conveyance, e.g., locations at which the object to be conveyed should be moved or stopped and a particular sequence of operating steps, it has inconveniently been necessary to prepare a specific roller conveyor which is useful exclusively for such particular requirements, namely, which is particularly arranged so that the respective rollers are arranged at the locations suitable for them.

In the roller conveyor of prior art, the friction roller has usually been constructed as will be described. Specifically, the friction roller comprises a hollow roller supported by radial ball bearing around a center shaft so that said hollow roller is rotatable around the axis and slightly movable along the axis and a sprocket supported by said center shaft so that said sprocket may be rotationally driven by engagement with a chain but axially unmovable. An axial force of a compression coil spring mounted on the hollow roller adjacent one end thereof biases the hollow roller in a direction such that a friction surface defined by the hollow roller at the other end is biased against a friction surface difined by the sprocket. A frictional force generated by this contact between the friction surfaces causes the hollow roller to be rotated in operative association with the sprocket. When the object to be conveyed is inhibited from further movement, a slippage occurs between the friction surfaces and stops rotation of the hollow roller.

In the friction roller of such construction, said compression coil spring has its opposite ends bearing against a spring shoe mounted on the center shaft, on one side, and against an inner race of the radial ball bearing, on the other side, so that the axial biasing force of the compression coil spring which is directly exerted on the inner race is then transmitted through balls and an outer race of the radial ball bearing to the hollow roller. Consequently, the radial ball bearing is often exposed to an unbearably large axial force between the inner race and the balls as well as between the balls and the outer race, resulting in a defective function and a shortened life of the radial ball bearing.

SUMMARY OF THE INVENTION

The problem as mentioned above is solved, in accordance with the present invention, by a roller conveyor comprising a plurality of center shafts connected between a pair of frames extending in parallel to each other, a friction tube mounted at least on one end of each said center shaft in rotatable but axially unmovable manner, said friction tube being formed around one end thereof adjacent said one end of said center shaft with a male thread and on the other end with a diameter-enlarged block of which the end surface facing said on end of said center shaft defines a friction surface, a sprocket rotatably mounted on said friction tube, including a cylindrical portion provided in alignment with and in contiguity to said diameter-enlarged block of said friction tube, and said cylindrical portion having an end surface defining a friction surface adapted to be in contact with the first-mentioned friction surface, a nut to be engageably put on said male thread of said friction tube, a compression coil spring mounted on said friction tube between said nut and said sprocket, a hollow roller rotatably mounted around said center shaft and loosely surrounding at an end said diameter-enlarged block of said friction tube and said cylindrical portion of said sprocket, a pair of through-holes radially extending through said end of said hollow roller to the outer peripheral surface of said diameter-enlarged block forming a part of said friction tube and the outer peripheral surface of said cylindrical portion forming a part of said sprocket, respectively, fastening members detachably inserted into said respective through-holes so as to be engaged with said diameter-enlarged block and said cylindrical portion, respectively, so that said hollow roller may be rotated integrally with said friction tube or said sprocket, and a chain adapted to be engaged with said sprocket and thereby to rotate said sprocket.

When it is desired to use the hollow roller as a drive roller in the above-mentioned construction of the present invention, the fastening member is inserted into only one of said pairly provided through-holes that is associated with the cylindrical portion of the sprocket until said fastening member is firmly engaged with said cylindrical portion. The hollow roller is thereby united with the sprocket so that the hollow roller may be rotated integrally with the sprocket. As the sprocket is rotationally driven by the chain, the hollow roller is also rotated and forcibly moves the object placed thereon forward.

When the hollow roller is used as a free roller, the pair of through-holes are left free from the fastening members received therein so that the hollow roller can be maintained rotatable with respect to both the friction tube and the sprocket. In this manner, rotation of the sprocket is not transmitted to the hollow roller and, in consequence, the hollow roller is rotated or stopped as the object placed thereon is moved or stopped.

When it is desired to use the hollow roller as a friction roller, the fastening member is inserted into only on of said paired through holes that is associated with the diameter-enlarged block of the friction tube until the fastening member is firmly engaged with said diameter-enlarged block. Thus the hollow roller is united with the friction tube so as to be rotatable integrally with the friction tube. The friction surface difined by the sprocket is biased against the friction surface defined by the diameter-enlarged block of the friction tube under the axial force exerted by the compression coil spring, so the friction tube is rotatable integrally with the sprocket under the frictional force generated between these two friction surfaces.

So long as the object placed on the hollow roller is allowed to move without any obstruction, the friction tube is rotated integrally with the sprocket to move said object as the sprocket is rotationally driven by the chain. When the object is inhibited from being further moved, both the hollow roller and the friction tube are inhibited from further rotation under the frictional force generated between the outer peripheral surface of the hollow roller and the object to be conveyed, and a slippage occurs between the friction surface defined by the friction tube now inhibited from further rotation and the friction surface defined by the sprocket continuing to rotate.

It should be understood that a magnitude of the frictional force generated between the friction tube and the sprocket can selectively set by adjustably rotating the nut engaged with the male thread of the friction tube and thereby regulating a compression load of the compression coil spring.

As will be apparent from the above-mentioned manner of operation, the hollow roller carried by each center shaft can be selectively used as a drive roller, a free roller or a friction roller in the roller conveyor of the invention. Accordingly, to accommodate a change of the conveying requirements imposed along the path of conveyance, for example, locations at which the object to be conveyed should be moved or stopped and the sequence of operating steps, the function of each hollow roller may be selectively adjusted to that of a drive roller, a free roller or a friction roller by selectively inserting or removing the fastening members. In this way, the roller conveyor of this invention allows the program of conveyance to be readily changed to accommodate a variety of conveying requirements and makes it unnecessary to prepare an exclusively useful roller conveyor every time the conveying requirements are changed, as has been the case for the prior art.

In the roller conveyor of this invention, the compression coil spring serving to generate the frictional force under which the hollow roller is rotated in operative association with the sprocket is mounted on the friction tube between the nut engaged with the male thread of the friction tube and the sprocket mounted on the same friction tube so that the sprocket is biased by the compression coil spring not directly against the hollow roller but against the friction tube coupled to the hollow roller and thereby generates a desired frictional force.

As a result, both the radial bearing provided between the center shaft and the friction tube and the radial bearing provided between the center shaft and the hollow roller are free from the axial force of the compression coil spring. With an advantageous consequence, these radial bearings are effectively protected against a defective function and a shortened life thereof due to said axial force of the compression coil spring.

DESCRIPTION OF PREFERRED EMBODIMENT

Figure 1:
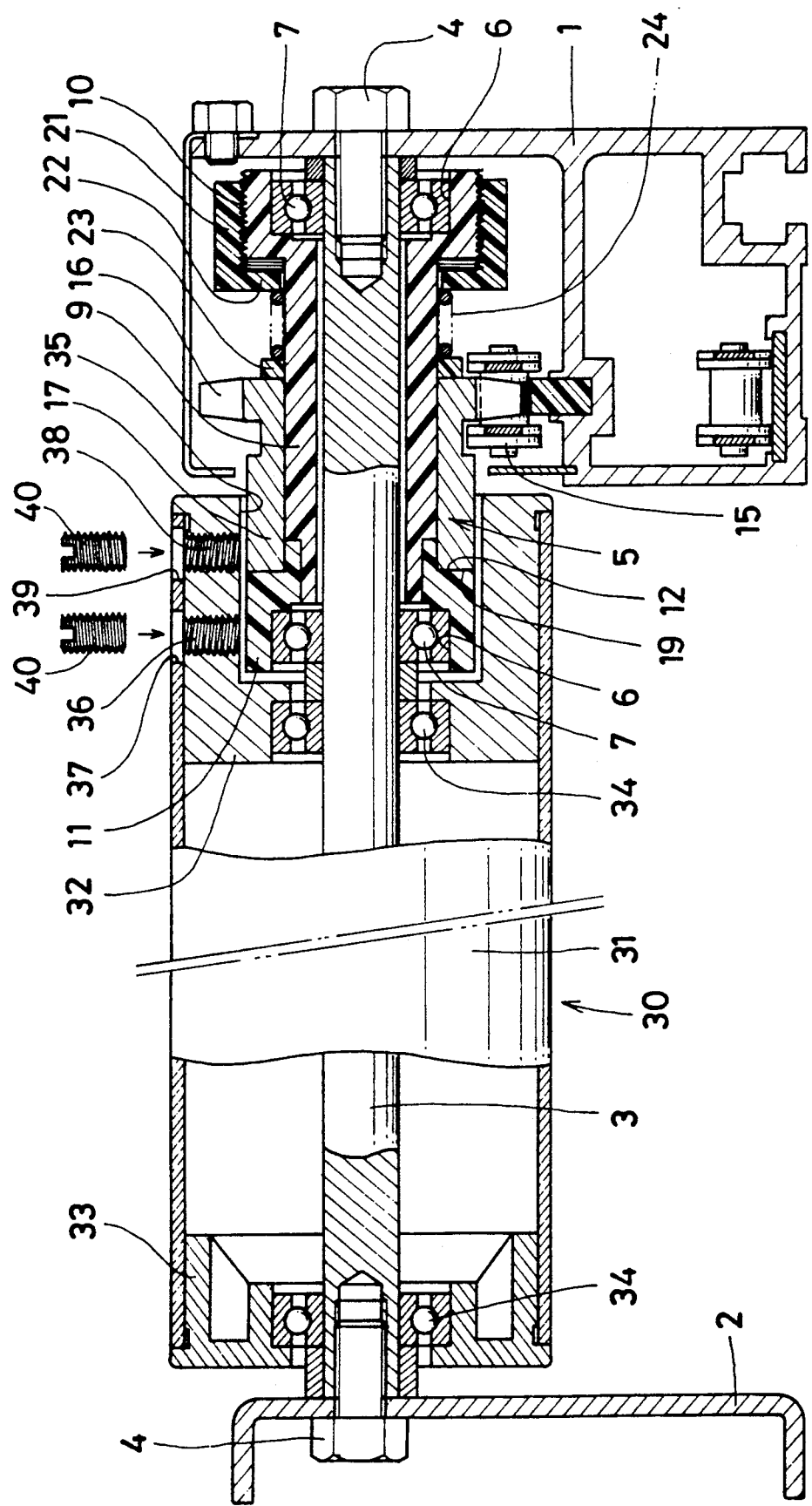
FIG. 1 is front view showing an embodiment of the present invention as partially broken away.

The above and other features and advantages will be more apparently understood from the following detailed description of a preferred embodiment made in reference with the accompanying drawing.

Referring to FIG. 1, reference numerals 1 and 2 designate long and narrow frames extending in parallel to each other between which a plurality of center shaft 3 horizontally extend in axis-parallel relationship transversely of the frames 1, 2. Each of said center shafts 3 is fixed between the frames 1, 2 by means of bolts 4, 4 extending through the respective frames 1, 2 into longitudinally opposite end surfaces of the center shaft 3.

Adjacent the right end of the center shaft 3, as viewed in FIG. 1, a cylindrical friction tube 5 is coaxially mounted on this center shaft 3 so as to be rotatable around the axis with interposition of radial ball bearings, 7, 7 provided within longitudinally opposite circular recesses 6, 6 of said friction tube 5, respectively, but so as to be axially unmovable. The friction tube 5 comprises a tubular main body 9 made of synthetic resin of which a diameter-enlarged right end is formed therearound with a male thread 10 and an annular diameter-enlarged block also made of synthetic resin (corresponding to a diameter-enlarged portion defined by the appended claim as one of the important features) 11 which is fixed to the left end of the tubular main body 9 with adhesive so that said diameter-enlarged block 11 is rotatable integrally with the tubular main body 9. The right end surface of the diameter-enlarged block 11 cooperates with said tubular main body 9 to form a step and thereby to define a friction surface 12 extending transversely of the axial direction.

A chain 15 extends in parallel to the direction in which the center shafts are arranged in parallel with one another so as to be driven by a drive source (not shown) such as an electromotor and thereby to run along an endless path, on one hand, and a sprocket 16 adapted to be engaged with said chain 15 is mounted on each of the friction tubes 5, on the other hand, wherein said sprocket 16 is not only rotatable relatively to this friction tube 5 around the axis thereof but also slightly displaceable relatively to this friction tube 5 along the axis thereof. As illustrated, the sprocket 16 is formed with a cylindrical portion 17 having the same outer diameter as that of the diameter-enlarged block 11 forming a part of the friction tube 5 and projecting leftward. The left end surface of this cylindrical portion 17 extends transversely of the axial direction and defines a friction surface 19 confronting the friction surface 12 defined by the friction tube 5.

A nut 21 made of synthetic resin formed at its left end with an inwardly facing flange 22 for locking is brought into engagement with the previously mentioned male thread 10 formed around the right end of the friction tube 5. A washer 23 made of synthetic resin is rotatably mounted on the friction tube 5 in contact with the right end surface of the sprocket 16. Between the flange 22 of the nut 21 and the right end surface of the washer 23 there is provided around the friction tube 5 a compression coil spring 24 serving to bias both the washer 23 and the sprocket 16 leftward. The friction surface 19 defined by the cylindrical portion 17 of the sprocket 16 is normally biased by said compression coil spring 24 against the friction surface 12 defined by the diameter-enlarged block 11 of the friction tube 5 and consequently a desired frictional force is developed between these friction surfaces 12, 19.

It should be understood that the frictional force thus generated between the friction surface 12 defined by the friction tube 5 and the friction surface 19 defined by the sprocket 16 can be easily adjusted by rotating the nut 21 engaged with the male thread 10 of the friction tube 5 and thereby laterally moving the nut 21 relatively to the friction tube 5. Specifically, a rightward movement of the nut 21 will decrease the frictional force since the spacing between the nut 21 and the washer 23 will be enlarged and the biasing force of the compression coil spring 24 will be correspondingly decreased while a leftward movement of the nut 21 will increase the frictional force since said biasing force will be correspondingly increased.

A hollow roller 30 comprising a pipe 30 and a pair of annular bearing cases 32, 33 provided at opposite ends of said pipe 31, respectively, is mounted around each of the center shafts 3 so that the hollow roller 30 is rotatably supported by radial ball bearings 34, 34 contained within the respective bearing cases 32, 33 around the center shaft 3 but axially unmovable. The bearing case 32 on the right end of the hollow roller 30 is formed with a circular recess 35 into which the diameter-enlarged block 11 of the friction tube 5 and the cylindrical portion 17 of the sprocket 16 are rotatably received leaving a slight clearance with respect to the inner wall of the recess 35.

Said bearing case 32 on the right end of the hollow roller 30 is additionally formed with a radially extending female-threaded hole (corresponding to a through-hole defined by the appended claim as another feature of the invention) 36 of which a radially outer opening is aligned with a mounting hole 37 of the pipe 31 and a radially inner opening is opposed to the outer peripheral surface of the diameter-enlarged portion 11 forming a part of the friction tube 5. The same bearing case 32 is further formed with a radially extending female-threaded hole (corresponding to another through-hole defined by the appended claim as still another feature of the invention) 38 of which a radially outer opening is aligned with another mounting hole 39 of the pipe 31 and a radially inner opening is opposed to the outer peripheral surface of the cylindrical portion 17 forming a part of the sprocket 16. These female-threaded holes 36, 38 are adapted for engageably receiving respective screws (corresponding to fastening members defined by the appended claim as additional features of the invention) 40, 40.

In this embodiment of the roller conveyor having a construction as has been described hereinabove, each of the hollow rollers 30 may be selectively used as a drive roller, free roller or friction roller depending on a particular location along a traveling path of the roller conyeyor.

When the hollow roller 30 is used as a drive roller, the screw 40 may be put into the female-threaded hole 38 formed in said hollow roller 30 together with the other female-threaded hole 36 until the front end of this screw 40 is pressed against the outer peripheral surface of the cylindrical portion 17 making a part of the sprocket 16 with which said female-threaded hole 38 is associated. Thus the hollow roller 30 is united with the sprocket 16 so as to be rotated integrally with said sprocket 16 as the latter is rotationally driven by the chain 15. An object to be conveyed (not shown) which is placed just on this hollow roller 30 is conveyed forward as this hollow roller 30 is thus rotated.

During this rotation of the hollow roller 30, the friction tube 5 is also rotated integrally with the sprocket 16 under the frictional force generated by the biasing effect of the compression coil spring 24 between the friction surface 12 defined by the diameter-enlarged block 11 of the friction tube 5 and the friction surface 19 defined by the cylindrical portion 17 of the sprocket 16.

When the hollow roller 30 is used as a free roller, both the female-threaded holes 36, 38 of this hollow roller 30 may be left free from the screws 40, 40 to be threaded thereinto so that said hollow roller 30 can be maintained rotatable with respect to both the friction tube 5 and the sprocket 16. In this manner, even when the friction tube 5 is rotated integrally with the sprocket 16 under the frictional force generated between the friction surfaces 12, 19 as the sprocket 16 is rotationally driven by the chain, such rotation is not transmitted to the hollow roller 30.

With a consequence, when the object to be conveyed which is placed just on this hollow roller 30 is moved or stopped by means other than the roller conveyor, no slippage occurs between this hollow roller 30 and the object to be conveyed and the hollow roller 30 is rotated or stopped as said object is moved or stopped.

When the hollow roller 30 is used as a friction roller, the screw 40 may be threaded into the female-threaded hole 36 formed in this hollow roller 30 together with the other female-threaded hole 38 until the front end of this screw 40 is pressed against the outer peripheral surface of the diameter-enlarged block 11 with which said female-threaded hole 36 is associated. Thus the hollow roller 30 is united with the friction tube 5 but not with the sprocket 16.

From this state, the sprocket 16 is rotationally driven by the chain. So long as the object placed just on this hollow roller 30 is allowed to be moved without any obstruction, a rotating moment of the sprocket 16 is transmitted to the friction tube 5 by the frictional force generated between said friction tube 5 and said sprocket 16 and consequently the hollow roller 30 is rotated integrally with this friction tube 5. With a consequence, said object is conveyed forward without any slippage occurring relatively to the hollow roller 30.

When said object to be conveyed is inhibited from being further moved, for example, as a result of bearing against a stopper (not shown), both the hollow roller 30 and the friction tube 5 are also inhibited from further rotation under the frictional force generated between the outer peripheral surface of the hollow roller 30 and said object to e conveyed.

It should be understood that a slippage occurs between the friction surface 12 defined by the friction tube 5 now inhibited from further rotation and the friction surface 19 defined by the sprocket 16 continuing to be rotated. At this moment, a slippage occurs also between the washer 23 and the sprocket 16 since the nut 21 engaged with the male thread 10 of the friction tube 5, the compression coil spring 24 and the washer 23 also have been inhibited from their further rotation.

When it is desired to switch the function of the hollow roller 30 from the drive roller to the free roller, the screw 40 may be removed from the female-threaded hole 38, and when it is desired to switch the function of the hollow roller 30 from the drive roller to the friction roller, the screw 40 may be removed from the female-threaded hole 38 and the screw 40 may be put into the other female-threaded hole 36. Similarly, the respective screws may be selectively put into and/or removed from the respective female-threaded holes to switch the function of the hollow roller 30 from the free roller to the drive roller or the friction roller or from the friction roller to the drive roller or the free roller. Accordingly, the conveyance program can be freely changed to accommodate a change in the requirements for conveyance.

The compression coil spring 24 adapted to generate a frictional force sufficient to rotate the hollow roller 30 being used as the friction roller in operative association with the sprocket 16 is mounted between the nut 21 put on the male thread 10 of the friction tube 5 and the sprocket 16 mounted around the same friction tube 5 so that the sprocket 16 is biased by this compression coil spring 24, instead of directly against the hollow roller 30, against the diameter-enlarged block 11 of the friction tube 5 and thereby generates a frictional force. Coupling between the friction tube 5 and the hollow roller 30 is achieved by a radial clamping force provided by the screws 40.

Such arrangement assures that both the friction tube 5 and the hollow roller 30 are free from any axial biasing effect due to the biasing force of the compression coil spring 24 as well as the force which clamps the friction tube 5 and the hollow roller 30 together.

In this manner, the radial ball bearings 7, 7 interposed between the center shaft 3 and the friction tube 5 as well as the radial ball bearings 34, 34 interposed between the center shaft 3 and the hollow roller 30 are not affected by any axial biasing force. With a consequence, these radial ball bearings 7, 7, 34, 34 are reliably protected against defective operation and shortened life due to said biasing force of the compression coil spring 24 and said force coupling the hollow roller 30 to the friction tube 5.

While the specific embodiment illustrated and described hereinabove employs the screws 40 cooperating with the respective female-threaded holes 36, 38 as fastening members to rotate the hollow roller 30 integrally with the friction tube 5 or with the sprocket 16, these fastening members may be any other means such as pins.

While this specific embodiment provides the friction tube 5, the nut 21, the compression coil spring 24, the sprocket 16 and the chain 15 only on one side of the hollow roller 30, these components may be provided on either end of the hollow roller 30.

What is claimed is:

1. A roller conveyor comprising:

a plurality of center shafts connected between a pair of frames extending in parallel to each other;

a friction tube mounted at least on one end of each said center shaft i rotatable but axially unmovable manner, said friction tube being formed around one end thereof adjacent said one end of said center shaft with a male thread and on the other end with a diameter-enlarged block of which the end surface facing said one end of said center shaft defines a friction surface;

a sprocket rotatably mounted on said friction tube, including a cylindrical portion provided in alignment with and in contiguity to said diameter-englarged block of said friction tube, and said cylindrical portion having an end surface defining a friction surface adapted to be in contact with the first-mentioned friction surface;

a nut to be engageably put on said male thread of said friction tube;

a compression coil spring mounted on said friction tube between said nut and said sprocket;

a hollow roller rotatably mounted around said center shaft and loosely surrounding at an end said diameter-englarged block of said friction tube and said cylindrical portion of said sprocket;

a pair of through-holes radially extending through said end of said hollow roller to the outer peripheral surface of said diameter-enlarged block forming a part of said friction tube and the outer peripheral surface of said cylindrical portion forming a part of said sprocket, respectively;

fastening members detachably inserted into said respective through-holes so as to be engaged with said diameter-enlarged block and said cylindrical portion, respectively, so that said hollow roller may be rotated integrally with said friction tube or said sprocket; and a chain adapted to be engaged with said sprocket and thereby to rotate said sprocket.

* * * * *

UNITED STATES PATENT AND TRADEMARK OFFICE
CERTIFICATE OF CORRECTION

PATENT NO. : 5,147,024
DATED : September 15, 1992
INVENTOR(S) : Yamada

It is certified that error appears in the above-identified patent and that said Letters Patent is hereby corrected as shown below:

Column 8, line 14 (Claim 1, line 5) delete "i" and insert "in".

Signed and Sealed this

Twenty-eighth Day of September, 1993

Attest:

BRUCE LEHMAN

Attesting Officer     Commissioner of Patents and Trademarks